United States Patent [19]

Lam

[11] Patent Number: 4,466,289
[45] Date of Patent: Aug. 21, 1984

[54] CAPACITANCE MANOMETER WITH DIGITAL OUTPUT

[76] Inventor: Calvin K. Lam, 77 Wallace Rd., R.F.D. 9, Bedford, N.H. 03102

[21] Appl. No.: 358,854

[22] Filed: Mar. 17, 1982

[51] Int. Cl.³ .............................................. G01L 9/12
[52] U.S. Cl. ...................................... 73/724; 73/718; 361/283; 331/65
[58] Field of Search .................... 73/724, 718; 331/65; 361/283

[56] References Cited

U.S. PATENT DOCUMENTS 3,838,684 10/1974 Manuel .................................. 73/724

Primary Examiner—Donald O. Woodiel

[57] ABSTRACT

A capacitive pressure or vacuum gauge is disclosed that utilizes a transducer in which a change in capacitance between a movable conductive diaphragm and the wall of the transducer is used to sense changes in pressure or vacuum. The change in capacity is converted directly into a change in frequency of a digital signal by means of a simple resistance/capacitance oscillator in which the capacitive transducer is used as the capacitance.

7 Claims, 3 Drawing Figures

CAPACITANCE MANOMETER WITH DIGITAL OUTPUT

FIELD OF THE INVENTION

This invention relates to pressure or vacuum measuring devices using a variable capacitance to detect changes in pressure or vacuum.

BACKGROUND OF THE INVENTION

In industrial manufacturing and processing systems, especially those used in the manufacture of semiconductor components, it is often necessary to precisely measure vacuum or pressure at various points in the system by means of sensitive manometers or measuring instruments. The measurements produced by the instruments must be converted into electrical signals in order to remotely display the value of the measured variables or to provide inputs for automatic process control systems. In particular, in order to meet the needs of many modern processing systems the pressure or vacuum measuring devices must be able to accurately measure pressure or vacuum over a range of values spanning several orders of magnitude.

Several different types of prior art manometers have been developed to meet the range and electrical conversion requirements. Each of these prior art devices has specific limitations which cause it to be less than ideal in use in modern processing systems.

One well-known prior art analog gauge is the ion gauge which measures pressure or vacuum by monitoring an ionization current developed in a vacuum from a glowing filament. The ion gauge did not meet the range requirements stated above, for although it is suitable for high vacuums, it does not work well in low vacuum (less than $10^{-2}$ torr) environments.

A type of manometer which is suitable for both high vacuum, low vacuum and pressure environments is the capacitive manometer. This type of manometer usually consists of a transducer and a signal processing circuit to convert that resulting change in capacitance into an electrical signal. The transducer has a housing or casing that is divided into two sections by a thin metal diaphragm that is attached to the housing under tension. A port is provided in one section of the housing which can be connected to the source of pressure or vacuum to be measured. Variations in pressure or vacuum at the port are applied to the diaphragm to cause motion of the diaphragm. This motion varies the capacitance of a "capacitor" formed by the diaphgram and a fixed electrode attached to the housing wall.

Various methods have been developed to convert the change in capacitance to electrical which is suitable for use by the system which provides the process control. One such method has been to energize the variable capacitance produced by the pressure transducer with a frequency source that generates an electrical signal having a fixed frequency. Changes in the capacitance of the pressure transducer are thereby converted into changes in the current running through the capacitor. This current analog of the measured pressure can then be displayed on a meter or other display device or can be provided to processing circuitry.

Although the analog capacitive system works over the required pressure ranges, it has problems with linearity, thermal drift and line and "white" noise. Specifically, at low pressures (or high vacuums), the physical movement of the diaphragm is very small and thus the change in capacitance of the transducer is also very small. Since the signal is very small, noise and drift problems are exacerbated.

Prior art attempts have been made to eliminate some of the drift and noise problems by converting the analog signal into a digital signal and using this signal to drive display or processing circuitry. However, the analog-to-digital convertors have themselves produced noise and drift problems.

Other prior art attempts to remove noise and drift problems has resulted in a manometer which utilizes the transducer capacitance as a feedback element in a mechanical oscillator arrangement that includes the transducer diaphragm. The diaphragm is physically vibrated by means of external magnetic coils at a frequency which is dependent on the transducer capacitance. The output frequency is thereby also dependent of the value of the pressure applied to the diaphragm, since the apllied force changes the mechanical resonance of the diaphragm. This arrangement successfully eliminates some of the noise problem, however, requires a significant amount of energy to operate the driving coils located around the transducer diaphragm.

It is therefore an object of the present invention to eliminate noise and drift problems inherent in the prior art capacitance manometers.

It is another object of the invention to produce circuitry which directly presents the value of the transducer capacitance as a digital output.

It is a further object of the invention to utilize energizing circuitry which is simple enough to be mounted directly on the transducer unit itself so that the transducer unit provides a digital output signal which is less affected by noise and drift problems.

SUMMARY OF THE INVENTION

The foregoing problems are solved and the foregoing objects are achieved in one illustrative embodiment of the invention in which the transducer capacitance is included as the capacitance in a resistance/capacitance oscillator circuit so that the frequency of the oscillator circuit is varied in direct proportion to changes in the capacitance which, in turn, are caused by changes in the pressure or vacuum to be measured by the device.

Specifically, changes in capacitance between the transducer diaphragm and transducer housing are detected by means of an resistance/capacitance oscillator circuit which includes two comparators and a flip/flop. The transducer capacitance is charged from a power supply by means of a series resistance. When the voltage across the capacitance is below a reference potential, one comparator applies a signal to the reset input of the flip-flop to reset it. As the capacitor continues to charge, the voltage across it eventually exceeds a second reference potential. In response to this condition, the second comparator applies a set signal to the set-reset flip/flop which is thereupon set, in turn, operating a transistor to discharge the capacitance. The voltage across the capacitance then decreases until it falls below the first reference potential at which point the first comparator resets the flip/flop and the charging is initiated. The output of the flip/flop is therefore a digital square wave with a frequency related to the value of the capacitance developed by the transducer.

DETAILED DESCRIPTION

Figure 1:
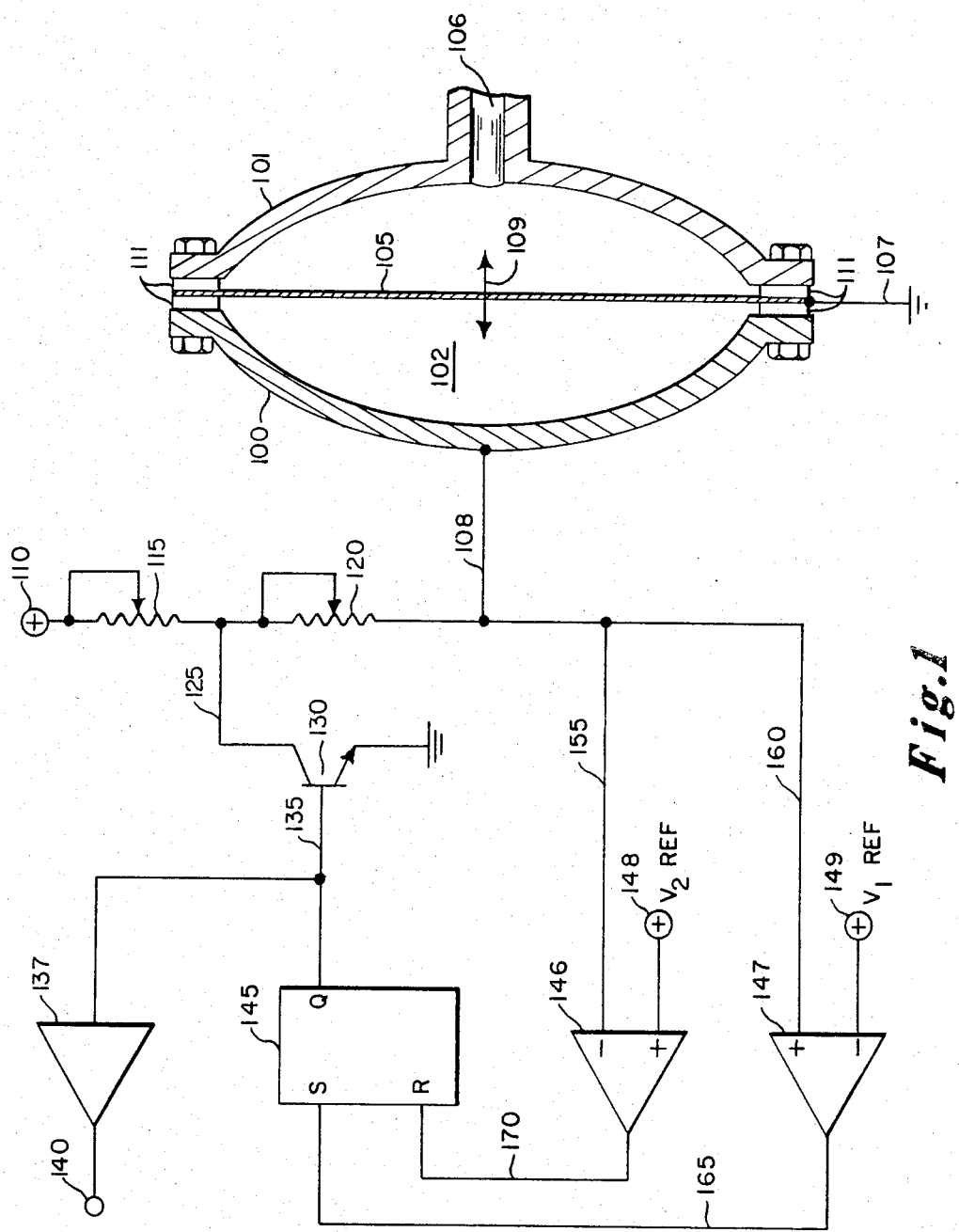
FIG. 1 shows a block schematic diagram of the inventive capacitive manometer circuit.

Referring to the drawing, a capacitive pressure or vacuum transducer is shown in cross-section. Connected to the transducer is an illustrative capacitance-to-frequency conversion oscillator circuit.

The capacitive transducer is composed of two housings 100 and 101 which are identical, with the exception of pressure inlet tube 106 in housing 101. The two housing sections are bolted together to form a closed container for obtaining pressure measurements. Separating the two sections of the housing is a diaphragm 105, which is formed of metal under uniform tension. Diaphragm 105 and housing half-section 100 form an enclosed volume 102 which can be maintained at various pressure or vacuum levels depending on the specific application for the transducer. Diaphragm 105 is electrically insulated from housing pieces 100 and 101 by means of insulating spacers 111. Pressure variations introduced through tube 106 cause the diaphragm to move in the direction of arrows 109.

A "capacitor" is formed with one plate being housing 100 and the other plate diaphragm 105. Since diaphragm 105 is electrically grounded by means of lead 107, the capacitive transducer appears electrically as a capacitor with one plate grounded. The other plate of the capacitor is connected, by means of lead 108, to R.C. oscillator circuitry comprising transistor 130, flip/flop 145 and comparators 146 and 147.

Figure 2:
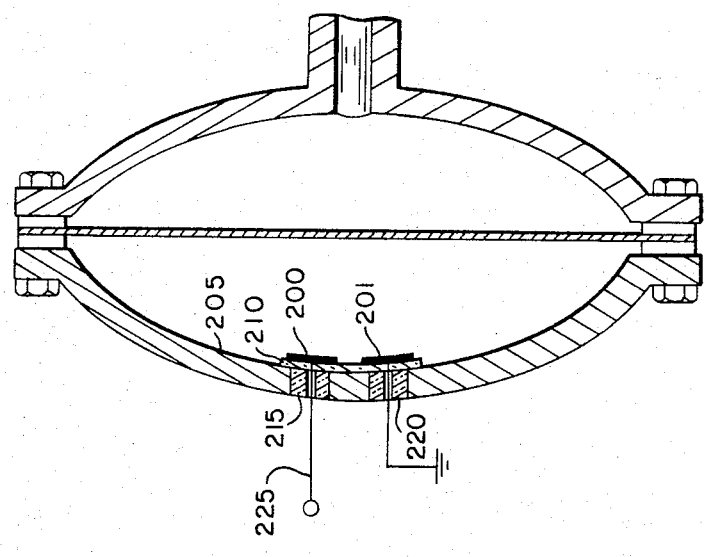
FIG. 2 shows an alternative capacitive transducer arrangement.

The transducer shown in FIG. 1 is suitable for most applications. Alternatively, the transducer arrangement shown in FIG. 2 may be used. This is a well-known differential capacitive arrangement. It consists of the same mechanical arrangement as the transducer shown in FIG. 1. The transducer differs electrically in that two capacitor plates, 200 and 201 are utilized. Plates 200 and 201 are insulated from housing piece 205 by insulators 210, 215 and 220. Plate 200 may be connected to the electronic circuitry shown in FIG. 1 by means of lead 225 and plate 201 may be grounded in order to make the circuit operative. The capacitive transducer is charged from D.C. voltage source 110 which is, in turn, connected to the transducer by means of variable resistors 115 and 120. The voltage developed by the charging circuitry across the transducer is monitored and controlled by the remainder of the oscillator circuitry. Specifically, the negative input of comparator 146 and the positive input of comparator 147 are connected to the transducer. The other inputs of comparators 146 and 147 are connected to reference voltage sources 148 ($V2_{Ref}$) and 149 ($V1_{Ref}$). Voltage sources 148 and 149 are arranged so that $V1_{Ref}$ is greater than $V2_{Ref}$. These voltage sources can be derived by means of resistors from voltage source 110 or may be provided by means of Zener diodes or other suitable means. The voltages developed by these sources are compared to the voltage developed across the capacitive transducer and used to develop switching points for the oscillating output signal.

The outputs of comparators 146 and 147 are, in turn, used to control flip/flip 145 to develop the output waveform. Specifically, the outputs of comparator 146 and 147 are connected, via leads 170 and 165, respectively, to the reset and set inputs of flip/flop 145. The output of flip/flop 145 on lead 135 is connected to the base of transistor 130 (which is used to discharge the capacitive transducer at the end of each cycle) and, in addition, to the input of buffer amplifier 137. The output waveform of the circuitry is developed at the output of buffer amplifier 137 on terminal 140.

The operation of the circuitry in converting the change in capacitance developed by the capacitive transducer into a frequency modulated signal will now be described in detail. Assume, initially, that the transducer capacitance has been discharged. A charging current flows from source 110 through variable resistors 115 and 120 and lead 108 and the capacitor formed by housing 100 and diaphragm 105 to ground. Initially, the voltage across the capacitor is less than both reference voltage sources $V2_{Ref}$ and $V1_{Ref}$. Since the voltage across the capacitive transducer is applied to the negative input of comparator 146 by means of lead 155, the voltage applied to the negative input of comparator 146 is less than the voltage applied to the positive input of comparator 146 and the comparator applies a "high" signal, via lead 170, to the reset input of set-reset flip/flop 145, resetting the flip/flop and causing it to produce a "low" signal on its output Q.

This "low" signal is applied to buffer amplifier 137 and appears as a "low" signal on output 140. In addition, the "low" signal at the output of flip/flop 145 is applied, via lead 135, to transistor 130 holding it "off" to allow the charging process to continue. As the voltage across the capacitance formed by the capacitance manometer increases, at some point, the voltage is applied, via lead 160, to the positive input of comparator 147 exceeds the value of the $V1_{Ref}$ voltage produced by source 149. At this point, comparator 147 applies a "high" signal, via lead 165, to the set input of flip/flop 145. In response to the "high" signal at its set input, flip/flop 145 applies a "high" signal at its output Q which "high" signal is applied to the output terminal 140 by buffer amplifier 137. In addition, the "high" signal on the Q output of flip-flop 145 turns "on" transistor 130. The capacitive transducer then discharges, via lead 108, resistor 120 and lead 125 through turned-on transistor 130. Accordingly, the voltage across the capacitive transducer decreases at a rate determined by the resistor/capacitor time constant formed by the value of the transducer capacitance and the value of variable resistor 120. When the voltage across the transducer capacitance falls below $V1_{Ref}$, comparator 147 removes the "high" signal from its output.

During the discharge cycle the voltage across the transducer capacitance continues to decrease and eventually becomes less than $V2_{Ref}$. At this point, comparator 146 produces a "high" signal at its output 170 which signal is applied to the reset input of flip/flop 145. In response thereto, flip/flop 145 is reset, producing a "low" signal at its output which turns "off" transistor 130 terminating the discharge cycle and allowing a charging cycle to begin. In addition, the "low" signal at the output of flip/flop 145 is applied to output terminal 140 via buffer amplifier 137.

Operation continues in this matter with the transducer capacitance charging through variable resistors 115 and 120 and discharging through resistor 120. The charge and discharge cycles are reflected at the circuit output by "low" and "high" signals respectively. Since the charge and discharge times are dependent on the value of the transducer capacitance, the frequency of the output waveform is also dependent on the value of the transducer capacitance. By appropriate adjustment of variable resistors 115 and 120, both the the duty cycle and the frequency of the output waveform may be adjusted.

Figure 3:
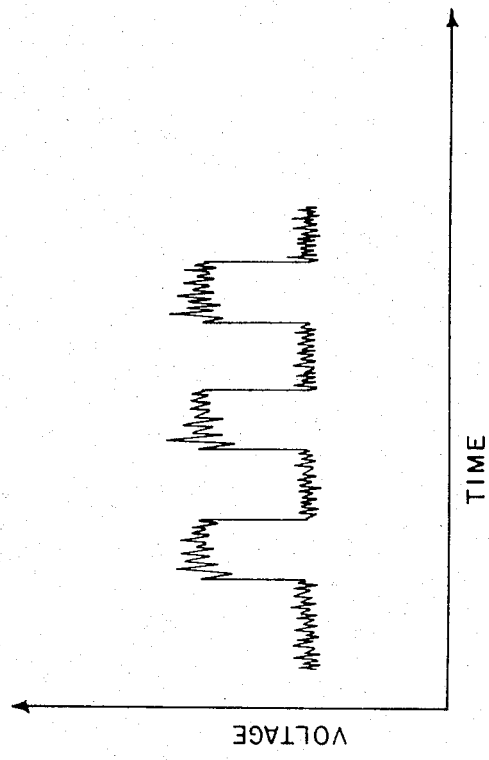
FIG. 3 shows an illustrative output waveform.

A typical output waveform produced on the terminal 140 is shown in FIG. 3 and may be provided to a frequency counter or a frequency-to-voltage convertor for conversion to an electrical signal useful with processing apparatus or other equipment. At high vacuum level, when the output signal is small comparing to normal background noise, the frequency output of this invention entails a smaller percentage of error in the frequency counter than the analog measurement of the prior art. This is illustrated in FIG. 3.

In some cases a radio-frequency ground loop may be formed because diaphragm 105 (or plate 201 in FIG. 2) is grounded. The ground loop may introduce noise into the system which is unacceptable. To avoid this problem, according to the invention, the oscillator circuitry which converts the analog signal produced by the transducer into the digital output at terminal 140 may be run from a single power source if resistive dividers are used to provide reference voltage sources $V1_{Ref}$ and $V2_{Ref}$. In addition, the components which comprise the oscillator circuitry are available commercially packaged as an integrated circuit known as a type 555 integrated timer circuit. In this case, the electrical apparatus may be battery-operated, thereby allowing the diaphragm (or plate) to electrically "float". The ground loop problem may be thus avoided.

In addition, if the electronic circuitry is battery-operated it may be mounted physically close to the transducer unit in order to reduce noise pickup. Since the frequency output produced at terminal 140 is much less susceptible to noise than the analog signal produced by the capacitive transducer, the transducer and oscillator arrangement may be mounted at a distance from the utilization apparatus without sacrificing noise immunity.

Although only a single illustrative embodiment of the invention has been disclosed herein other embodiments within the spirit and the scope of the invention will be obvious to those skilled in the art.

What is claimed is:

1. A capacitance manometer comprising:
   a vacuum or pressure transducer for converting relative changes in vacuum or pressure values into relative changes in transducer capacitance; and
   means responsive to the electrical voltage across said transducer capacitance for producing a first signal when said voltage equals a first value;
   means responsive to the electrical voltage across said transducer capacitance for producing a second signal when said voltage equals a second value;
   means responsive to said first signal for electrically charging said transducer capacitance and responsive to said second signal for electrically discharging said transducer capacitance; and
   means responsive to said first and second signals for producing an output frequency signal proportionally related to the value of said transducer capacitance.

2. A capacitance manometer according to claim 1 wherein said pressure transducer comprises a housing and a diaphragm attached to said housing, said diaphragm moving in response to changes in vacuum or pressure applied thereto, and said transducer capacitance is formed between said housing and said diaphragm.

3. A capacitance manometer according to claim 2 wherein said means for producing said first signal comprises a first comparator for comparing the voltage across said transducer capacitance to a first reference voltage.

4. A capacitance manometer according to claim 3 wherein said means for producing said second signal comprises a second comparator for comparing the voltage across said transducer capacitance to a second reference voltage.

5. A capacitance manometer according to claim 4 wherein said means for charging and discharging said transducer capacitance comprises a bistable device responsive to said first signal for entering one of its two states and responsive to said second signal for entering the other of its two states.

6. A capacitance manometer according to claim 5 wherein said means for charging and discharging said transducer capacitance further comprises a switch connected across said transducer capacitance, said switch being controlled by said bistable device to open or close.

7. In a capacitance manometer having a vacuum or pressure transducer including a housing and a diaphragm attached to said housing said diaphragm moving in response to changes in vacuum or pressure applied thereto to form a variable transducer capacitance between said housing and said diaphragm, the improvement comprising:
   resistance/capacitance oscillator means responsive to said changes in the transducer capacitance for producing an output signal, said resistance/capacitance oscillator means comprising:
   means responsive to the electrical voltage across said transducer capacitance for producing a first signal when said voltage equal a first value and for producing a second signal when said voltage equals a second value; and
   means responsive to said first signal for electrically charging said transducer capacitance and responsive to said second signal for electrically discharging said transducer capacitance so that said resistance/capacitance oscillator produces an output signal whose frequency varies directly and proportionately with changes in the value of said capacitance.

* * * * *